United States Patent
Jung et al.

(10) Patent No.: US 10,396,864 B2
(45) Date of Patent: Aug. 27, 2019

(54) REFERENCE SIGNALS, MEASUREMENTS, AND DEMODULATION ARCHITECTURES AND METHODS

(71) Applicant: Intel IP Corporation, Santa Clara, CA (US)

(72) Inventors: Hyejung Jung, Palatine, IL (US); Huaning Niu, Milpitas, CA (US); Yuan Zhu, Beijing (CN); Pingping Zong, Randolph, NJ (US)

(73) Assignee: Intel IP Corporation, Santa Clara, CA (US)

( * ) Notice: Subject to any disclaimer, the term of this patent is extended or adjusted under 35 U.S.C. 154(b) by 7 days.

(21) Appl. No.: 15/564,629

(22) PCT Filed: Dec. 23, 2015

(86) PCT No.: PCT/US2015/000321
§ 371 (c)(1),
(2) Date: Oct. 5, 2017

(87) PCT Pub. No.: WO2016/182529
PCT Pub. Date: Nov. 17, 2016

(65) Prior Publication Data
US 2018/0076857 A1   Mar. 15, 2018

Related U.S. Application Data

(60) Provisional application No. 62/159,076, filed on May 8, 2015.

(51) Int. Cl.
*H04L 12/28* (2006.01)
*H04B 7/0408* (2017.01)
(Continued)

(52) U.S. Cl.
CPC ........ *H04B 7/0408* (2013.01); *H04B 7/0617* (2013.01); *H04B 7/0695* (2013.01);
(Continued)

(58) Field of Classification Search
CPC .................... H04B 7/0617; H04W 72/005
(Continued)

(56) References Cited

U.S. PATENT DOCUMENTS

2013/0230013 A1* 9/2013 Seo .................... H04L 27/2602
370/329
2013/0258972 A1 10/2013 Kim et al.
(Continued)

FOREIGN PATENT DOCUMENTS

| WO | 2013/169055 A1 | 11/2013 |
| WO | 2014/116090 A1 | 7/2014 |
| WO | 2014/126519 A1 | 8/2014 |

OTHER PUBLICATIONS

International Search Report dated Mar. 16, 2016 for International Application PCT/US2015/000321.
(Continued)

*Primary Examiner* — John Pezzlo
(74) *Attorney, Agent, or Firm* — Eschweiler & Potashnik, LLC

(57) ABSTRACT

An architecture configured to be employed within one or more user equipments (UEs). The architecture includes a communications array and a control component. The communications array is configured to receive one or more reference signals of one or more reference signal ports of a subframe. The reference signals are analog beamformed cell-specific reference signals associated with one or more cells. The control component is configured to decode the
(Continued)

received reference signals and perform analog beam tracking and demodulation based on the one or more received reference signals.

20 Claims, 8 Drawing Sheets

(51) Int. Cl.
*H04B 7/06* (2006.01)
*H04B 7/08* (2006.01)
*H04J 1/16* (2006.01)
*H04W 72/00* (2009.01)
*H04W 72/04* (2009.01)

(52) U.S. Cl.
CPC ............. *H04B 7/086* (2013.01); *H04B 7/088* (2013.01); *H04W 72/005* (2013.01); *H04W 72/0446* (2013.01)

(58) Field of Classification Search
USPC .................................. 370/252, 329, 386, 503
See application file for complete search history.

(56) References Cited

U.S. PATENT DOCUMENTS

| | | | |
|---|---|---|---|
| 2014/0198696 A1* | 7/2014 | Li | H04W 52/0229 370/311 |
| 2014/0321563 A1 | 10/2014 | Park et al. | |
| 2015/0373627 A1* | 12/2015 | Ryu | H04W 48/16 455/434 |

OTHER PUBLICATIONS

"Discussion on RSRQ definition," Agenda Item: 6.3. Source: Intel Corporation; 3GPP TSG-RAN WG4 Meeting #69, San Francisco, CA, US, Nov. 11-15, 2013. R4-136189. 7 pages.

* cited by examiner

| PARAMETERS | VALUES |
| --- | --- |
| SYSTEM BANDWITH | 100 MHz |
| FFT SIZE | 2048 |
| SUBCARRIER FREQ SPACING | 75 KHz |
| SAMPLE RATE | 153.6 MHz |
| SAMPLING TIME | 6.5104 ns |
| TOTAL NUMBER OF SUBCARRIERS | 1201 (including DC subcarrier) |
| PHYSICAL RESOURCE BLOCK | 12 subcarriers, 7 OFDM symbols |
| IFFT/FFT PERIOD | 13.333 us |
| CYCLIC PREFIX DURATION | 1041.7 ns for block 0, 937.5 ns for block 1-6 |
| NUMBER OF OFDM/SC-FDMA SYMBOLS PER SUBFRAME | 14 |
| SUBFRAME DURATION | 200 us |
| FRAME DURATION | 2 ms |

REFERENCE SIGNALS, MEASUREMENTS, AND DEMODULATION ARCHITECTURES AND METHODS

REFERENCE TO RELATED APPLICATION

This application is a National Phase entry application of International Patent Application No. PCT/US2015/000321 filed Dec. 23, 2015, which claims priority to U.S. Provisional Application No. 62/159,076 filed May 8, 2015, entitled "REFERENCE SIGNAL, MEASUREMENTS, AND CONTROL CHANNEL DEMODULATION IN HIGH FREQUENCY BAND CELLULAR NETWORKS", in the name of Hyejung Jung, et al. and is hereby incorporated by reference in its entirety.

FIELD

The present disclosure relates to mobile wireless communication and reference signals used for communication.

BACKGROUND

Beamforming is a technique used in mobile communications, including telecommunications, to enhance communication and performance. Beamforming involves combining elements so that signals at some angles experience constructive interference while others experience destructive interference. Beamforming can be used at transmitting and/or receiving ends in order to achieve spatial selectivity. The improvement compared with omni-directional transmitting and receiving is referred to as a transmit/receive beamforming gain or loss.

Various beamforming techniques can be used, such as analog, digital, or hybrid (combination of analog and digital). The specific technique used can vary according to complexity, power consumption, beamforming coverage and beamforming gain.

BRIEF DESCRIPTION OF THE DRAWINGS

FIG. 3 is a diagram illustrating example physical layer system parameters for a reference signal for a frame in accordance with various aspects.

DETAILED DESCRIPTION

Figure 1:
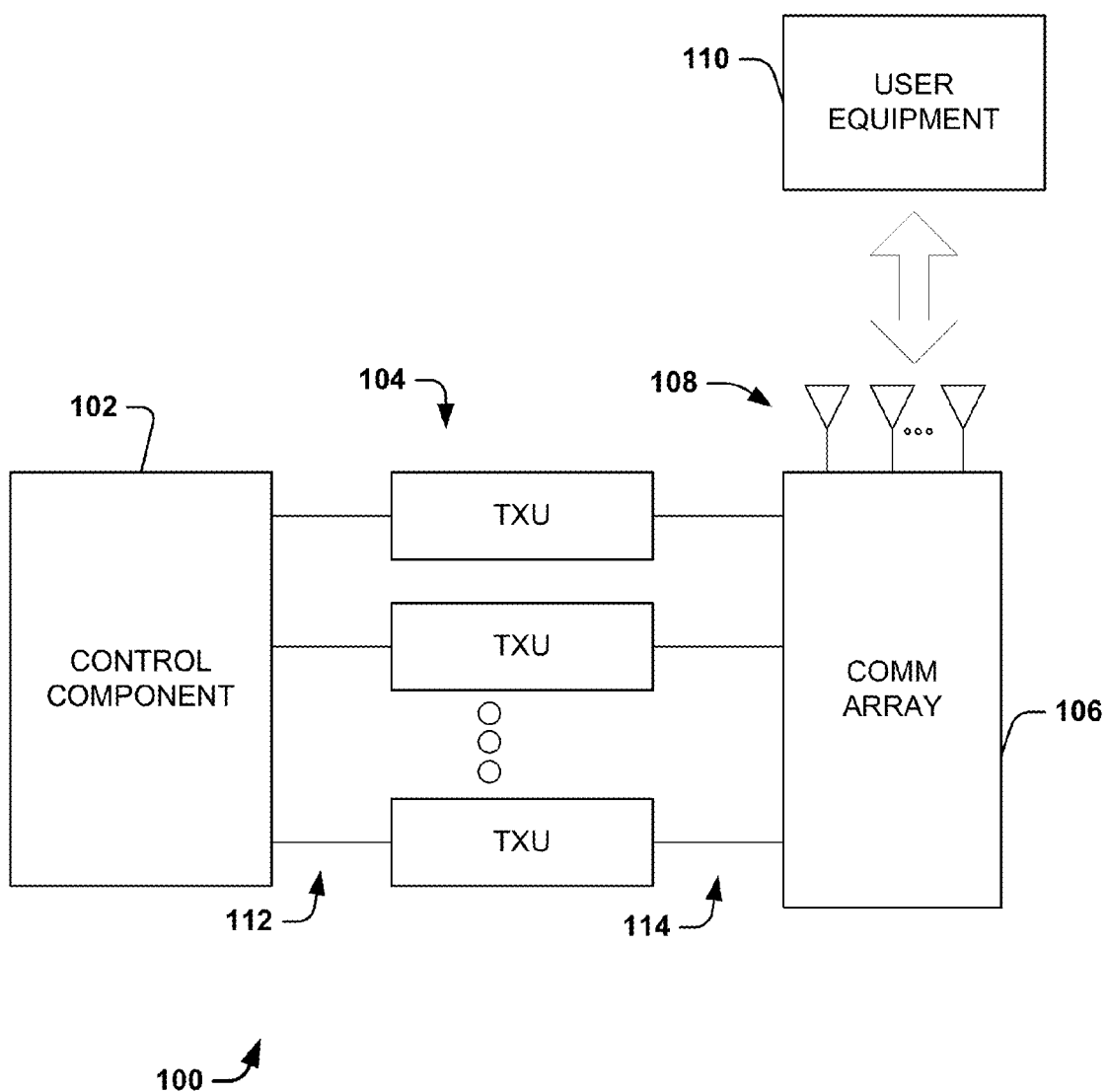
FIG. 1 is a diagram illustrating a beamforming architecture according to various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Beamforming is a signal processing technique that can be used in a communications array for directional signal transmission or reception. Components of a phased array are combined in such a way that signals at particular angles experience constructive interference while others experience destructive interference. Beamforming can be used at both the transmitting and receiving ends in order to achieve spatial selectivity. Compared to omni-directional reception/transmission the amount of improvement in signal strength is in the transmit/receive beamforming gain (or loss). Large bandwidths available at millimeter wave frequencies for communication systems can further be used to combat the exponential rise in the demand for data traffic. At millimeter wave frequencies, massive antenna arrays can be used to beamform communication signals in a particular direction in order to mitigate the effects of increased path loss. Beamforming can be applied either in the digital domain or analog radio frequency (RF) domain.

In particular, for frequency bands above 6 GHz, which include centimeter waves and millimeter waves, 15 GHz, 28 GHz and 60 GHz, exploiting relatively high beamforming gains with a large number of antennas both at evolved node B (eNodeB) and at user equipment (UE) is important to compensate for a large path loss. Analog-digital hybrid beamforming transceiving architectures and techniques can be employed to appropriately handle the large number of antennas. These architectures can handle the large number of antennas with reasonable hardware complexity and power consumption.

The beamforming architectures use and/or determine various information or communication metrics to facilitate communication. The communication metrics include channel state information (CSI) and radio resource management (RRM) measurements, achievable multi-input multi-output (MIMO) beamforming gains, coverage, and the like. The determination of the communication metrics is performed by taking into account system overhead and latency. The communication metrics are applicable to frequency division duplexing (FDD) systems and time division duplexing (TDD) systems that employ different antenna schemes for a transmitter and a receiver, or utilize un-calibrated antennas. Additionally, analog beamforming architectures with a limited number of receiver chains rely on using repeated reference signals to determine beamforming weights at the receiver.

The present disclosure includes various aspects/embodiments that facilitate beamforming communication architectures. The aspects and embodiments include a downlink reference signal design and use for receiver analog beamforming and demodulation. Additionally, CSI measurements and mobility measurements in high frequency band radio access technology (HFB RAT) based cellular network can be obtained.

FIG. 1 is a diagram illustrating a beamforming architecture 100 according to various aspects or embodiments. The architecture 100 incorporates a downlink reference signal design that facilitates beamforming, demodulation, CSI measurements, mobility measurements in HFB RAT based cellular networks and the like.

The architecture 100 can be included in one or more base stations or eNodeBs. The architecture includes a control component 102, a plurality of transmission units (TXU) 104 and a communications array. The beamforming architecture 100 is associated with a cell or small cell and transmits analog beamformed cell-specific reference signals (AB-CRS) in subframes. One or more reference-signal sequences used to generate the AB-CRS are determined based on a cell identity (ID) or combination of cell ID, beam ID, and other network entity IDs such as transmission point (TP) ID, and the determined one or more sequences are beamformed with analog beams. The AB-CRS can be provided in every subframe, pre-determined subframes, a set of semi-statically configured subframes and variations thereof.

The control component 102 can include one or more processors and a data store. The control component 102 can operate to process received or input signals by one or more pre-coders, encoders, decoders or other communication components for receiving or transmitting communication data. The control component 102 can, for example, receive a diversity of data signals from different carriers, such as RF signals in a broadband frequency range. The control component 102 can process received signals as millimeter wave signals for transmission in 5G or other wireless transmission in a system having phased array beam forming operations.

In this example, the beamforming architecture 100 is analog, however variations are contemplated that are hybrid of analog and digital, or digital.

The control component 102 is configured to generate subframes 112 of a frame. The subframes 112 can include reference signals, analog beamformed cell-specific reference signals (AB-CRS). The subframes 112 are associated with one of the plurality of transmission units 104 or logical ports. The transmission units 104 are also referred to as an AB-CRS port. Additional detail on the generation of the AB-CRS and the reference subframes 112 are provided infra.

A frame includes a number of the subframes 112, each subframe includes symbols and a portion of the symbols of each subframe can include the AB-CRS. In one example, a frame includes ten subframes and each subframe includes 14 orthogononal frequency division multiplexing (OFDM)/single carrier-frequency division multiple access (SC-FDMA) symbols, and one or more of the symbols carry AB-CRS. A frame can include a master information block.

The transmission units 104 are processing chains that are mapped to the communication array 106, which associates the transmission units 104 with an antenna of an antenna array 108. The number of transmission units 104 can vary, in one example there are 4, in another example there are 8, in yet another example there are more than 4. The transmission units 104 generate a plurality of signals 114 for transmission. It is appreciated that the transmission units 104 can also be configured as receiver chains for receiving and processing received signals from the communication array 106.

The transmission units 104 include phase shifting components configured to phase shift the subframes 112 and other inputs according to selected beamshaping characteristics.

The AB-CRS can be multiplexed into an orthogonal frequency division multiplexing (OFDM) symbol, single carrier frequency division multiple access (SC-FDMA) symbol and the like. Additionally, the AB-CRS are separated from physical downlink shared channel (PDSCH) transmission in the time domain.

The communication array 106 is configured to operate as a beam forming device, such as an analog beam forming device. The communication array 106 receives the signals 114 and applies the selected beamforming characteristics and provides signals for transmission to the antenna array 108. The selected beamforming characteristics include selected angles or vectors in space or air and power levels.

The communication array 106 can include power amplifiers that have different levels of output powers for transmission.

A user equipment device 110 or devices can receive the transmitted signals. The user equipment device 110 utilizes the AB-CRS in order to determine communication metrics including, but not limited to CSI, radio resource management (RRM) measurements and the like. Additionally, the AB-CRS is used to generate beamforming weights at the receiving end.

The beamforming architecture 100 uses analog beam diversity along with channel coding and interleaving to transmit and/or receive physical channels conveying small size control information, such as physical control format indicator channel (PCFICH), physical hybrid ARQ indicator channel (PHICH), physical downlink control channel (PDCCH), physical broadcast channel (PBCH) and the like, including those intended for multiple UEs. Additionally, the AB-CRS are time-frequency multiplexed with the physical channels carrying control information. This allows the UEs, including the UE 110, to perform receiver analog beam tracking and control channel demodulation concurrently and to utilize radio resources more efficiently.

Figure 2:
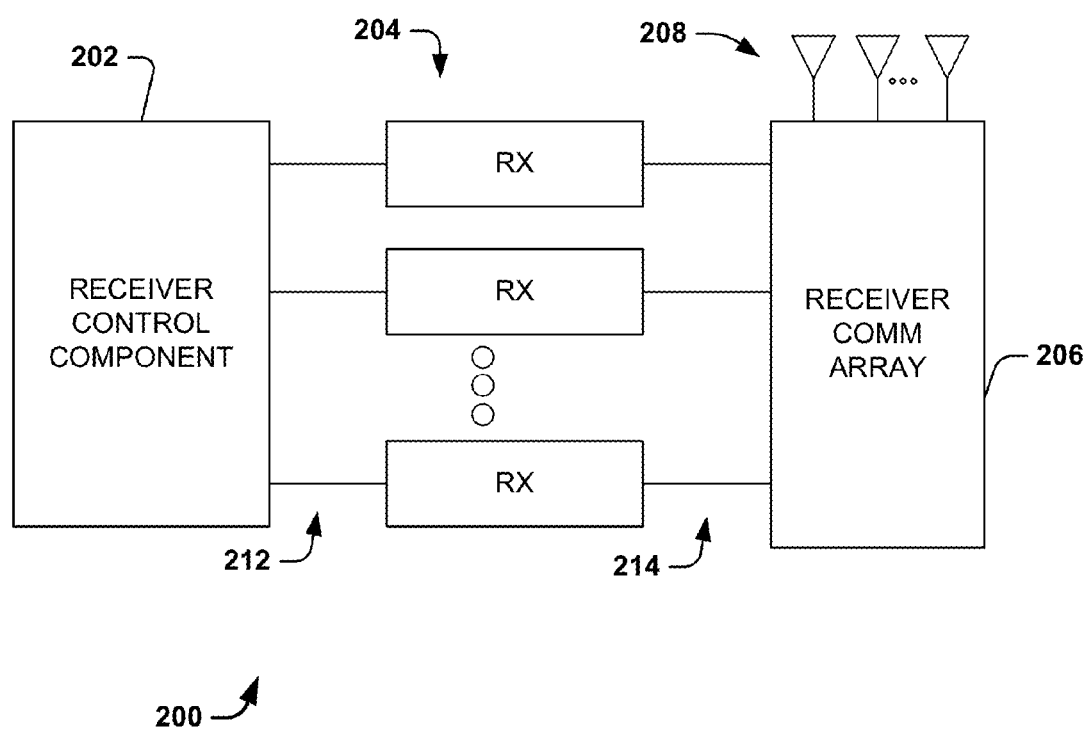
FIG. 2 is a diagram illustrating a receiver beamforming architecture in accordance with various aspects.

FIG. 2 is a diagram illustrating a receiver beamforming architecture 200 in accordance with various aspects or embodiments. The architecture 200 can be employed in user equipment (UE), mobile devices, and the like.

The receiver beamforming architecture 200 includes a receiver communication array 206, a plurality of receiver chains (RX) 204 and a receiver control component 202.

The receiver communication array 206 receives a plurality of signals via antennas 208. The receiver communication array 206 processes the received signals and provides processed signals 214 to the receiver chains 204. The receiver chains 204 provide receiver chain signals 212 to the receiver control component 202.

The receiver control component 202 obtains a plurality of AB-CRS from the receiver chain signals 212. Generally, the AB-CRS are used by the UE to perform channel estimation and estimate channel conditions. The AB-CRS are decoded by the control component 202, and in one example, the decoded AB-CRS are used to find a master information block (MIB). The MIB includes parameters needed by the UE for initial access to a cell.

The receiver control component 202 uses the decoded AB-CRS to determine communication metrics including channel state information (CSI) and radio resource management (RRM) measurements, achievable multi-input multi-output (MIMO) beamforming gains, coverage, and the like. The determination of the communication metrics is performed by taking into account system overhead and latency.

FIG. 3 is a diagram illustrating example physical layer system parameters 300 for a reference signal for a frame in accordance with various aspects or embodiments. The system parameters 300 are for a high frequency band radio access technology (HFB RAT) based cellular network. The system parameters 300 are examples of information that can be provided in the frame. It is appreciated that various aspects can use other suitable parameters in frames.

A small cell eNodeB is assumed to manage multiple beams simultaneously with multiple RF or TXU chains, for example 8. Thus, frequency selective scheduling and frequency selective (e.g., per subband) beamforming and/or precoding similar to current LTE-A can be supported without restriction.

The frame includes 10 subframes in this example. Each subframe includes 14 OFDM/SC-FDMA symbols. Within the subframe, a few symbols can be used to carry AB-CRS. The frame duration is 2 ms.

Figure 4:
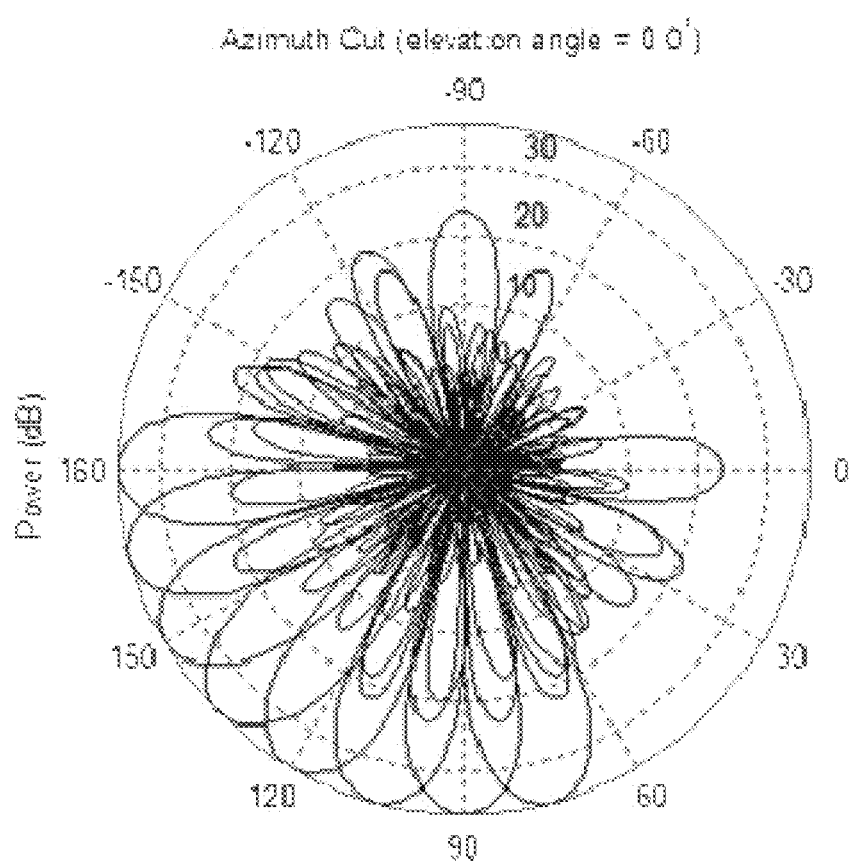
FIG. 4 is a graph depicting an example of predefined azimuth analog beam patterns that cover one eNodeB sector (120 degrees) and are mapped to 8 analog beamformed cell-specific reference signals (AB-CRS) ports.

FIG. 4 is a graph depicting an example of predefined azimuth analog beam patterns that are generated by 8x8 uniform planar array antennas, cover one eNodeB sector (120 degrees), and are mapped to 8 AB-CRS ports. Each TXU or RF chain at an eNodeB derives one beam pattern, which maps to each AB-CRS port. AB-CRS of a given AB-CRS port are beamformed signals with a beam pattern mapped to the AB-CRS port. In one example, mapping of beam patterns to AB-CRS ports is fixed on subframes where a UE is configured to perform measurement, and dynamic mapping of beam patterns to AB-CRS ports is assumed for other subframes. The predefined beam patterns can be used only for measurement and transmission of small size information, such as control information. User plane data transmission via PDSCH or dedicated physical control channels may employ other beamforming techniques, such as eigen-beamforming and the advanced beamforming weights can be mapped to demodulation reference signals (DM RS).

Figure 5A:
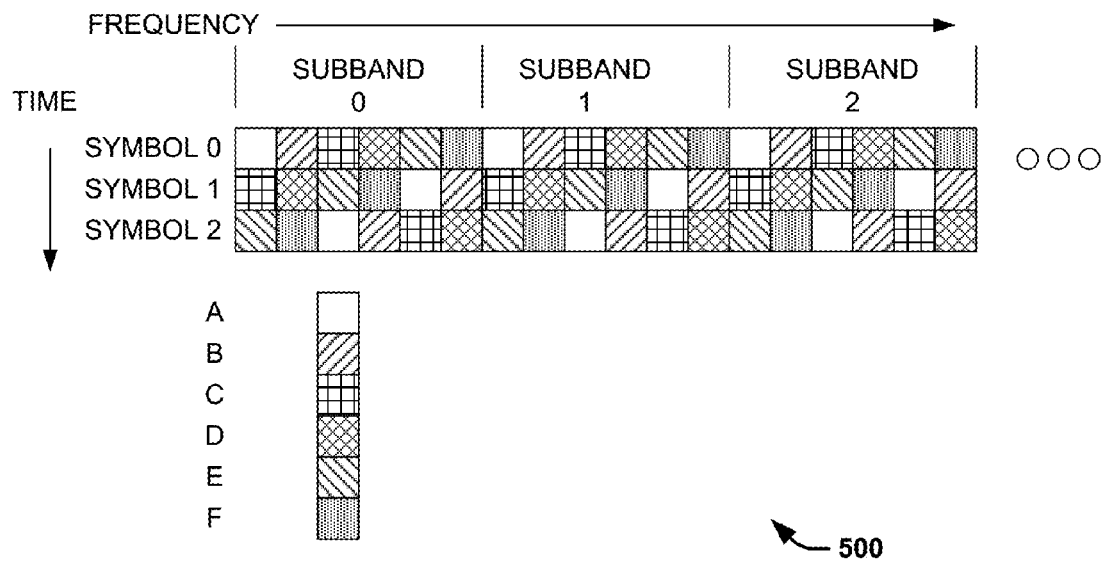
FIGS. 5A and 5B illustrate an example AB-CRS structure in terms of time-frequency radio resources in accordance with various aspects.
Figure 5B:
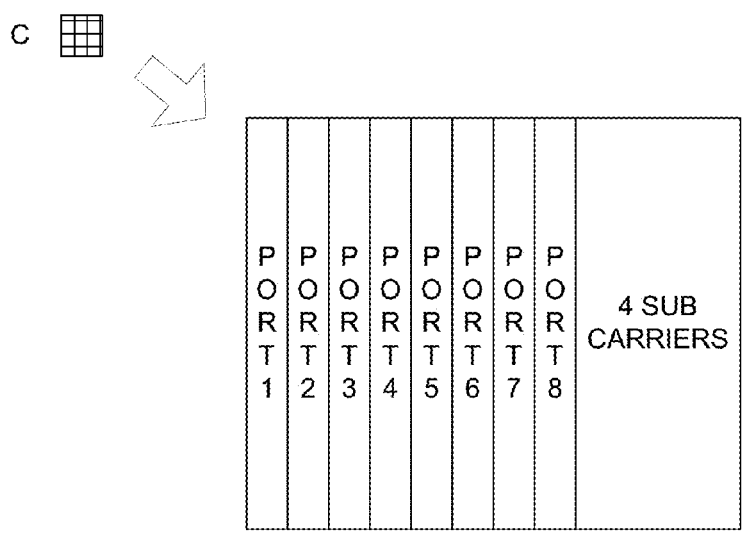

FIGS. 5A and 5B illustrate an example AB-CRS structure in terms of time-frequency radio resources in accordance with various aspects or embodiments. In this example, there are 8 AB-CRS ports configured. The AB-CRS are transmitted on symbols 0, 1 and 2 and the PDSCH region starts at symbol 3 or later (not shown). Thus, 3 symbols of a subframe are used to carry AB-CRS. A control region can also be present on symbols 0, 1, and 2, or utilize one or more symbols starting with the symbol 3. There are 50 resource elements (REs) in a subframe that are used for each AB-CRS port. A RE is a minimum resource unit in LTE, indicated by one OFDM/SC-FDMA symbol in time domain and one subcarrier in frequency domain.

Thus, 400 REs are used for 8 AB-CRS ports, which is a lower overhead than LTE cell-specific reference signals' (CRS) overhead, which uses 800 REs for 1 CRS port.

FIG. 5A depicts an example of the AB-CRS structure 500 according to time and frequency. Symbols 0-2 are shown along a time axis and subbands 0-2 are shown along a frequency axis. Additional symbols can be present for control regions, a PDSCH region and the like but are not shown for illustrative purposes. Additional subbands, for example 2-16, can be present along the frequency axis.

Resource elements are shown along with their associated cell group, A-F. It can be seen that AB-CRS REs are spread across subbands and symbols.

FIG. 5B depicts an example pattern 501 for a particular cell group. In this example, the pattern 501 is for the AB-CRS REs for the cell group C. The example pattern 501 is shown with 8 AB-CRS ports, numbered 1-8 and 4 subcarriers. Thus, the pattern 501 is based on 12 subcarriers. Additionally, the pattern 501 is based on one symbol duration.

Assuming that a channel response is almost constant over 3 symbols, a frequency distance between two adjacent AB-CRS subcarriers for a given AB-CRS port is set to be 1.8 MHz (24 subcarrier spacings).

Figure 6:
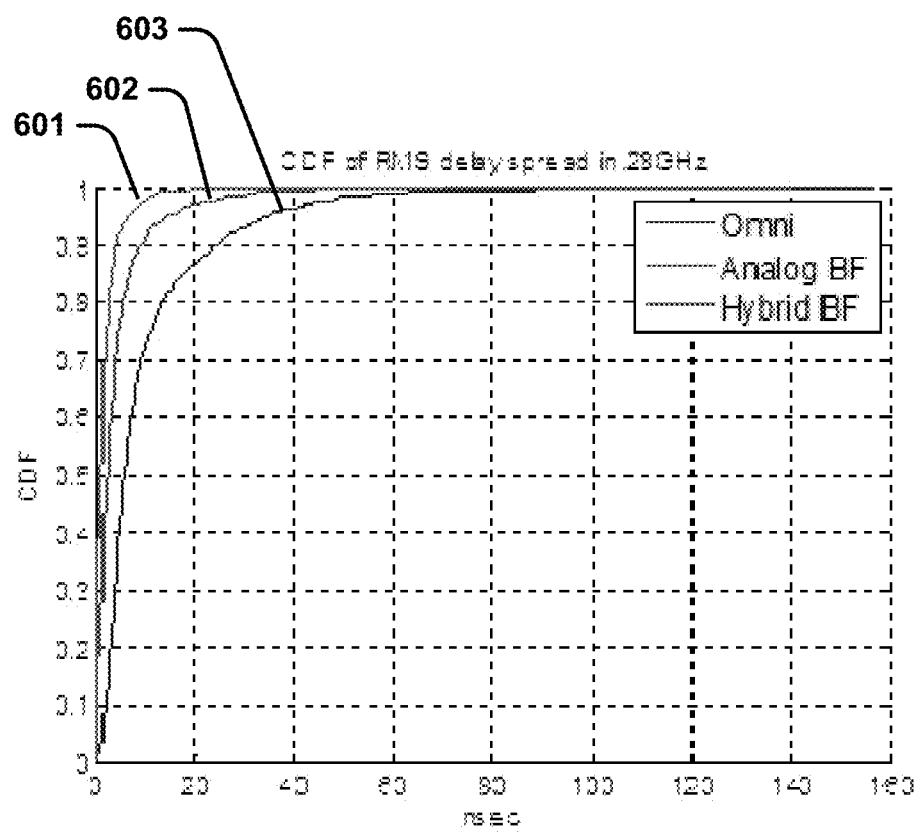
FIG. 6 is a graph illustrating an example of a cumulative density function (CDF) of root means squared (RMS) delay spread of 28 GHz channels in a dense urban scenario.

FIG. 6 is a graph 600 illustrating an example of a cumulative density function (CDF) of root means squared (RMS) delay spread of 28 GHz channels in a dense urban scenario.

The graph 600 depicts time in nano seconds along an x-axis and CDF along a y-axis. Three lines are shown for comparison. Line 603 is an example using hybrid beamforming, line 602 is an example using analog beamforming and line 601 is omni directional.

The graph 600 shows that transmission (TX) analog beamforming 602 results in a 90 percentile RMS delay spread of 9 nano seconds. Including other scenarios, effective RMS delay spread for other analog beamformed channels is expected to be 40 nano seconds or less. Thus, 50 percent coherence bandwidth is about 5 MHz or larger. Thus, UE can obtain, from AB-CRS, channel information to demodulate control channels, which are analog beamformed and time frequency multiplexed with AB-CRS.

To reduce the impact of inter-cell interference on received AB-CRS, adjacent small cells can be categorized as different cell groups for AB-CRS for RE mapping, such as according to a cell ID as in FIG. 5A, and use different AB-CRS REs as shown in FIGS. 5A and 5B.

Several example use cases are provided below. It is appreciated that the use cases are provided for illustrative purposes and that variations are contemplated and in accord with various aspects.

A first use case involves UE beam acquisition that is made during a cell search phase via receive beam scanning and/or using 2 or more UE RF chains. The beam acquisition involves finding one or more optimal sectors among 3-8 UE RX sectors. The receiving architecture, such as the architecture 200, obtains AB-CRS and uses the AB-CRS to find a finer granularity of optimal or improved analog beams at the UE. For situations where the UE is not able to acquire coarse beam direction, such as due to hardware limitations and/or lack of synchronization signals, the UE can acquire coarse and fine beam directions sequentially after measuring AB-CRS for a few subframes, assuming AB-CRS are transmitted in every subframe. During beam tracking, the UE applies a different Rx analog beam pattern to receive each symbol of symbols 0-2 as shown in FIG. 5A. The AB-CRS are directionally transmitted broadcast signals, thus they can be used by multiple UEs. Individual UEs or types of UEs can determine how often to perform measurements for beam acquisition or beam tracking. The UE types include, for example, smart phones, tablets, game consoles and the like.

A second use case involves utilizing AB-CRS for a UE's RRM measurement, based on which a serving small cell or an anchor small cell (for multi-cell coordinated transmission and reception) is determined. It is assumed that an associated eNodeB's coverage includes beam patterns which are mapped to all configured AB-CRS ports of AB-CRS subframes configured for RRM measurement. The UE can measure reference signal received power (RSRP) for each AB-CRS port and compute an aggregated RSRP. One simple example to compute the aggregated RSRP is given as follows:

$$\text{aggregated } RSRP = \max_r \sum_t RSRP_{t,r},$$

where t and r are TX and Rx beam pattern indices, respectively, and $RSRP_{t,r}$ denotes RSRP obtained with TX beam pattern t and Rx beam pattern r. A metric, aggregated Reference Signal Received Quality (RSRQ), can be defined as $$\text{aggregated } RSRQ = \max_r \frac{N \cdot \sum_t RSRP_{t,r}}{RSSI_r},$$

where $RSSI_r$ denotes Received Signal Strength Indicator (RSSI), which is the total received power over N number of resource blocks observed by UE with Rx beam pattern r.

Alternatively, the aggregated RSRP corresponding to omni (or sector-omni) directional reference signal transmission can be reconstructed in a way similar to how omnidirectional path loss model is constructed based on directional channel measurement. That is, the aggregated RSRP is computed with removing transmit beamforming gains as follows:

$$\text{aggregated } RSRP = \max_r \left( \sum_t \frac{RSRP_{t,r}}{G_t} \right),$$

where $G_t$ is a beamforming gain of TX beam pattern t. In another example, $$\text{aggregated } RSRP = \sum_r \sum_t \frac{RSRP_{t,r}}{G_t \cdot G_r},$$

where $G_r$ is a beamforming gain of Rx beam pattern r.

As the UE measures AB-CRS with beamforming gains, the measurement accuracy typically outperforms the case of measuring wide-beam reference signals. Furthermore, the aggregated RSRP takes into account received signal power from all TX directions, without requiring separate transmission of wide-beam based reference signals for RRM measurement.

A third use case involves using AB-CRS to determine downlink CSI measurements. A UE can measure TX and Rx analog beamformed channels for each TX and Rx analog beam-pair. Based on those measurements, the UE can estimate an optimal or improved baseband eNodeB precoding matrix to combine analog beams, an optimal number of spatial layers (rank), and an optimal modulation and coding scheme (MCS). An LTE CSI reporting framework such as channel quality indicator (CQI), precoding matrix indicator (PMI), and rank indicator (RI) reporting can be reused.

Additionally, the UE may report a few AB-CRS port indices whose per-port RSRP are higher than a configured threshold, in order to provide additional information for multi-user MIMO scheduling. If multi-cell/multi-site coordinated transmission and reception are employed, the UE can be configured for measuring and reporting per-port RSRP (or per-port CQI) for multiple configured cells. Per-port RSRP corresponding to TX beam pattern t can be defined as $$RSRP \text{ for } TX \text{ beam pattern } t = \max_r RSRP_{t,r}.$$

A fourth use case provides an example of demodulation of control channels with TX/RX analog beam diversity. Common control channels intended for multiple UEs in a cell may need to be transmitted via all analog beams assigned to AB-CRS ports, in order to reach all UEs within an intended coverage. For blind decoding of control channels, the concept of an LTE physical downlink control channel (PDCCH) "search space", a set of possible PDCCH locations, can be employed. In HFB RAT, a separate common search space for each TX analog beam can be defined, and a UE is supposed to check one or more common search spaces for one or more optimal TX analog beams. Note that the UE can determine one or more optimal TX analog beams by comparing measurements of different AB-CRS ports, and also obtain channel estimates for demodulation from AB-CRS. Furthermore, a PDCCH location consists of resource elements (REs) spanned over symbols configured for AB-CRS transmission. This ensures that UE can exploit Rx analog beam diversity to decode PDCCH.

In order to support a dynamically configurable control region, physical control format indicator channel (PCFICH) also needs to be transmitted via all analog beams assigned to AB-CRS ports. A fixed set of resource elements, which span over a wide frequency band (e.g. with a distributed subcarrier allocation) and AB-CRS symbols, can be configured for PCFICH transmission with each TX analog beam. The UE decodes analog beamformed PCFICH corresponding to its optimal TX analog beam. Again, the optimal TX analog beam can be determined by measurements of AB-CRS.

If the physical hybrid ARQ indicator channel (PHICH) intended to a particular UE is analog beamformed instead of hybrid beamforming, then AB-CRS can be used for demodulation of PHICH. One way to implicitly let a UE know a TX analog beam used for PHICH transmission is for an eNodeB to use a latest reported analog PMI for PHICH beamforming.

Figure 7:
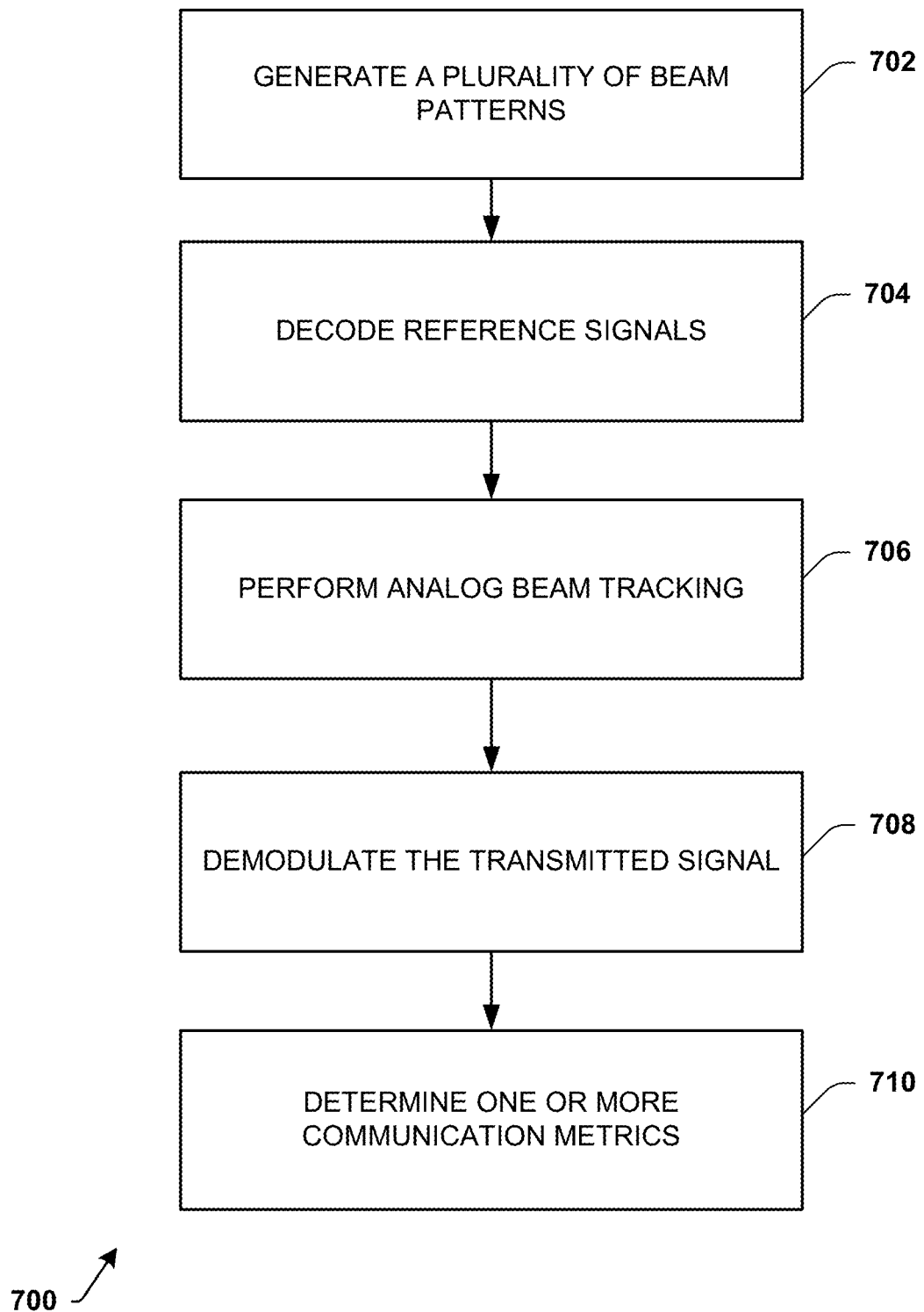
FIG. 7 is a flow diagram illustrating a method of using analog beamformed cell-specific reference signals in accordance with various aspects.

FIG. 7 is a flow diagram illustrating a method 700 of using analog beamformed cell-specific reference signals in accordance with various aspects or embodiments. The method 700 receives and decodes reference signals and uses the reference signals to determine communication metrics and perform beam tracking.

The method 700 begins at 702, where a plurality of beam patterns are generated as a transmission signal. An eNodeB or other network entity is configured to generate the transmission signal. The signal includes analog beamformed cell-specific reference signals (AB-CRS) associated with one or more cells.

An indication of the number of AB-CRS can also be sent prior to or part of the transmission signal. In one example, an MIB is configured to include an indication of the number of symbols within a subframe to be used to carry the reference signals.

The AB-CRS are decoded from the transmitted signal at block 704. A suitable technique can be used to obtain and decode the AB-CRS.

Analog beam tracking of the transmitted signal is preformed at block 706 using the decoded reference signals. The analog beam tracking involves determining receiver beamforming weights and the like.

The transmitted signal is demodulated at block 708 using the decoded AB-CRS.

One or more communication metrics are determined at block 710 using the decoded reference signals. The communication metrics include channel state information (CSI) and radio resource management (RRM) measurements, achievable multi-input multi-output (MIMO) beamforming gains, coverage, and the like. The determination of the communication metrics is performed by taking into account system overhead and latency. The communication metrics are applicable to frequency division duplexing (FDD) systems and time division duplexing (TDD) systems that employ different antenna schemes for a transmitter and a receiver, or utilize un-calibrated antennas.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
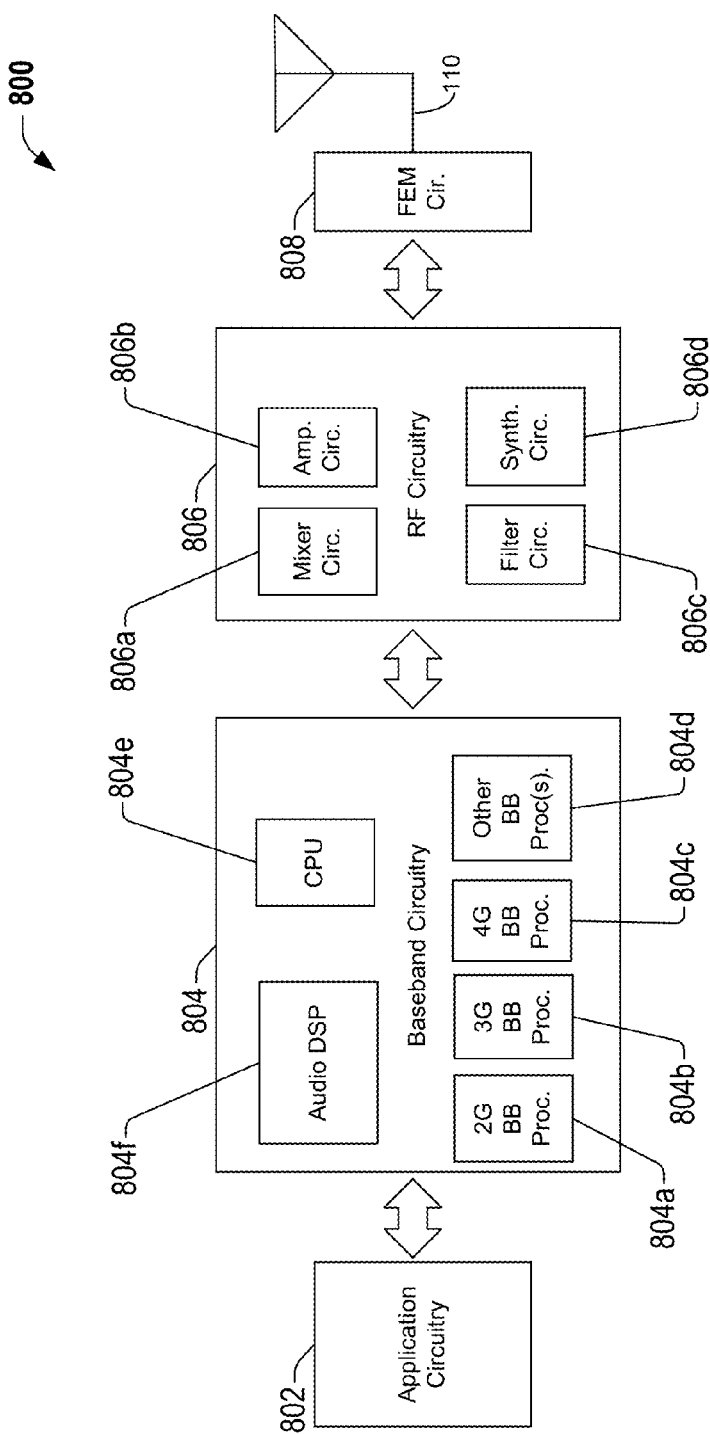
FIG. 8 illustrates, for one embodiment, example components of a User Equipment (UE) device.

Embodiments described herein can be implemented into a system using any suitably configured hardware and/or software. FIG. 8 illustrates, for one embodiment, example components of a User Equipment (UE) device 800. In some embodiments, the UE device 800 (e.g., the wireless communication device 101) can include application circuitry 802, baseband circuitry 804, Radio Frequency (RF) circuitry 806, front-end module (FEM) circuitry 808 and one or more antennas 880, coupled together at least as shown.

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 804 can include circuitry such as, but not limited to, one or more single-core or multi-core processors. The baseband circuitry 804 can include one or more baseband processors and/or control logic to process baseband signals received from a receive signal path of the RF circuitry 806 and to generate baseband signals for a transmit signal path of the RF circuitry 806. Baseband processing circuity 804 can interface with the application circuitry 802 for generation and processing of the baseband signals and for controlling operations of the RF circuitry 806. For example, in some embodiments, the baseband circuitry 804 can include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) can handle various radio control functions that enable communication with one or more radio networks via the RF circuitry 806. The radio control functions can include, but are not limited to, signal modulation/demodulation, encoding/decoding, radio frequency shifting, etc. In some embodiments, modulation/demodulation circuitry of the baseband circuitry 804 can include Fast-Fourier Transform (FFT), Inverse Fast Fourier Transform (IFFT), precoding, and/or constellation mapping/demapping functionality. In some embodiments, encoding/decoding circuitry of the baseband circuitry 804 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 can be configured to run elements of the protocol stack for signaling of the PHY, MAC, RLC, PDCP and/or RRC layers. In some embodiments, the baseband circuitry can include one or more audio digital signal processor(s) (DSP) 804f. The audio DSP(s) 804f can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 804 and the application circuitry 802 can be implemented together such as, for example, on a system on a chip (SOC).

In some embodiments, the baseband circuitry 804 can provide for communication compatible with one or more radio technologies. For example, in some embodiments, the baseband circuitry 804 can support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various embodiments, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some embodiments, the RF circuitry 806 can include a receive signal path and a transmit signal path. The receive signal path of the RF circuitry 806 can include mixer circuitry 806a, amplifier circuitry 806b and filter circuitry 806c. The transmit signal path of the RF circuitry 806 can include filter circuitry 806c and mixer circuitry 806a. RF circuitry 806 can also include synthesizer circuitry 806d for synthesizing a frequency for use by the mixer circuitry 806a of the receive signal path and the transmit signal path. In some embodiments, the mixer circuitry 806a of the receive signal path can be configured to down-convert RF signals received from the FEM circuitry 808 based on the synthesized frequency provided by synthesizer circuitry 806d. The amplifier circuitry 806b can be configured to amplify the down-converted signals and the filter circuitry 806c can be a low-pass filter (LPF) or band-pass filter (BPF) configured to remove unwanted signals from the down-converted signals to generate output baseband signals. Output baseband signals can be provided to the baseband circuitry 804 for further processing. In some embodiments, the output baseband signals can be zero-frequency baseband signals, although this is not a requirement. In some embodiments, mixer circuitry 806a of the receive signal path can comprise passive mixers, although the scope of the embodiments is not limited in this respect.

In some embodiments, the mixer circuitry 806a of the transmit signal path can be configured to up-convert input baseband signals based on the synthesized frequency provided by the synthesizer circuitry 806d to generate RF output signals for the FEM circuitry 808. The baseband signals can be provided by the baseband circuitry 804 and can be filtered by filter circuitry 806c. The filter circuitry 806c can include a low-pass filter (LPF), although the scope of the embodiments is not limited in this respect.

In some embodiments, the mixer circuitry 806a of the receive signal path and the mixer circuitry 806a of the transmit signal path can include two or more mixers and can be arranged for quadrature downconversion and/or upconversion respectively. In some embodiments, the mixer circuitry 806a of the receive signal path and the mixer circuitry 806a of the transmit signal path can include two or more mixers and can be arranged for image rejection (e.g., Hartley image rejection). In some embodiments, the mixer circuitry 806a of the receive signal path and the mixer circuitry 806a can be arranged for direct downconversion and/or direct upconversion, respectively. In some embodiments, the mixer circuitry 806a of the receive signal path and the mixer circuitry 806a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode embodiments, a separate radio IC circuitry can be provided for processing signals for each spectrum, although the scope of the embodiments is not limited in this respect.

In some embodiments, the synthesizer circuitry 806d can be a fractional-N synthesizer or a fractional N/N+8 synthesizer, although the scope of the embodiments is not limited in this respect as other types of frequency synthesizers can be suitable. For example, synthesizer circuitry 806d can be a delta-sigma synthesizer, a frequency multiplier, or a synthesizer comprising a phase-locked loop with a frequency divider.

The synthesizer circuitry 806d can be configured to synthesize an output frequency for use by the mixer circuitry 806a of the RF circuitry 806 based on a frequency input and a divider control input. In some embodiments, the synthesizer circuitry 806d can be a fractional N/N+8 synthesizer.

In some embodiments, frequency input can be provided by a voltage controlled oscillator (VCO), although that is not a requirement. Divider control input can be provided by either the baseband circuitry 804 or the applications processor 802 depending on the desired output frequency. In some embodiments, a divider control input (e.g., N) can be determined from a look-up table based on a channel indicated by the applications processor 802.

Synthesizer circuitry 806*d* of the RF circuitry 806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 806 can include an IQ/polar converter.

FEM circuitry 808 can include a receive signal path which can include circuitry configured to operate on RF signals received from one or more antennas 880, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 880.

In some embodiments, the FEM circuitry 808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 880.

In some embodiments, the UE device 800 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an architecture configured to be employed within one or more user equipments (UEs). The architecture includes a communications array and a control component. The communications array is configured to receive one or more reference signals of one or more reference signal ports of a subframe. The reference signals are analog beamformed cell-specific reference signals associated with one or more cells. The control component is configured to decode the received reference signals and perform analog beam tracking and demodulation based on the one or more received reference signals.

Example 2 includes the subject matter of Examples 1, including or omitting optional elements, where the communications array is further configured to receive an indication of a number of symbols to carry reference signals within a subframe from a network entity.

Example 3 includes the subject matter of any one of Examples 1-2, including or omitting optional elements, where the reference signals are separated from a physical downlink shared channel (PDSCH) region of the subframe in the time domain.

Example 4 includes the subject matter of any one of Examples 1-3, including or omitting optional elements, where the reference signals are frequency multiplexed within a symbol of the subframe.

Example 5 includes the subject matter of any one of Examples 1-4, including or omitting optional elements, where the reference signals are frequency multiplexed and transmitted on one or more symbols of the subframe.

Example 6 includes the subject matter of any one of Examples 1-5, including or omitting optional elements, where an indication of a number of symbols to carry the reference signals is provided via a master information block, wherein the indicated number of symbols corresponds to a minimum size for a control region.

Example 7 includes the subject matter of any one of Examples 1-6, including or omitting optional elements, where a frequency distance between two adjacent reference signal resource elements for each of the one or more reference signal ports is based on coherence bandwidths of effective channels resulting from transmit analog beamforming, wherein the transmit analog beamforming is associated with the reference signals and analog beamformed physical channels.

Example 8 includes the subject matter of any one of Examples 1-7, including or omitting optional elements, where wherein the control component is configured to measure a reference signal received power (RSRP) on the reference signals associated with each reference signal port of each cell, determine an aggregated RSRP and an aggregated reference signal received quality (RSRQ), wherein the aggregated RSRP and/or the RSRQ are used to determine a serving cell or an anchor cell.

Example 9 includes the subject matter of any one of Examples 1-8, including or omitting optional elements, where the control component is configured to determine communication metrics including channel state information measurement and radio resource management measurement.

Example 10 includes the subject matter of any one of Examples 1-9, including or omitting optional elements, where a network entity provides the reference signals in every subframe.

Example 11 includes the subject matter of any one of Examples 1-10, including or omitting optional elements, where the reference signals are received in pre-determined subframes.

Example 12 is an architecture configured to be employed within an eNodeB. The architecture includes a communications array and a control component. The communications array is configured to generate a transmission signal including a plurality of beam patterns according to a plurality of transmit signals. The control component is configured to generate the plurality of transmit signals that include reference signals multiplexed on one or more symbols of a subframe. The reference signals are analog beamformed cell-specific reference signals (AB-CSRs) associated with one or more cells.

Example 13 includes the subject matter of Example 12, including or omitting optional elements, where the beam patterns are associated with analog beamformed cell-specific reference signal ports.

Example 14 includes the subject matter of any one of Examples 12-13, including or omitting optional elements, where the transmission signal includes a frame having a master information block.

Example 15 includes the subject matter of any one of Examples 12-14, including or omitting optional elements, further including a plurality of transmission units.

Example 16 includes the subject matter of any one of Examples 12-15, including or omitting optional elements, where the control component is configured to provide reference signals in pre-determined subframes.

Example 17 includes one or more computer-readable media having instructions that, when executed, cause a user equipment (UE) to receive a transmitted signal, decode a plurality of reference signals from the transmitted signal, where the reference signals are analog beamformed cell-specific reference signals associated with one or more cells, perform analog beam tracking of the transmitted signal using the decoded reference signals and demodulate the transmitted signal using the decoded reference signals.

Example 18 includes the subject matter of Example 17, including or omitting optional elements, to further cause the UEs to receive an indication of a number of symbols to carry reference signals within a subframe.

Example 19 includes the subject matter of any one of Examples 17-18, including or omitting optional elements, where the reference signals are separated from a PDSCH region of a subframe.

Example 20 includes the subject matter of any one of Examples 17-19, including or omitting optional elements, where the transmitted signal includes a master information block.

Example 21 includes the subject matter of any one of Examples 17-20, including or omitting optional elements, to further cause the UEs to determine communication metrics, including channel state information (CSI) measurement and radio resource management measurement from the decoded reference signals.

Example 22 is an apparatus to be employed within a user equipment (UE), the apparatus includes a means for receiving a signal, a means for decoding reference signals from the signal, wherein the reference signals are analog beamformed cell-specific reference signals associated with one or more cells, a means for performing analog beam tracking of the transmitted signal using the decoded reference signals, and a means for demodulating the transmitted signal using the decoded reference signals.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An architecture configured to be employed within one or more user equipments (UEs), the architecture comprising:
a communications array configured to receive one or more reference signals of one or more reference signal ports of a subframe, wherein the reference signals are analog beamformed cell-specific reference signals associated with a combination of one or more cells and one or more beams; and
a control component configured to decode the received reference signals, determine radio resource management (RRM) measurements based on the decoded and received one or more reference signals, and perform analog beam tracking and demodulation based on the one or more received reference signals.

2. The architecture of claim 1, wherein the communications array is further configured to receive an indication of a number of symbols to carry reference signals within a subframe from a network entity.

3. The architecture of claim 1, wherein the reference signals are separated from a physical downlink shared channel (PDSCH) region of the subframe in the time domain.

4. The architecture of claim 1, wherein the reference signals are frequency multiplexed within a symbol of the subframe.

5. The architecture of claim 1, wherein the reference signals are frequency multiplexed and transmitted on one or more symbols of the subframe.

6. The architecture of claim 1, wherein an indication of a number of symbols to carry the reference signals is provided via a master information block, wherein the indicated number of symbols corresponds to a minimum size for a control region.

7. The architecture of claim 1, wherein a frequency distance between two adjacent reference signal resource elements for each of the one or more reference signal ports is based on coherence bandwidths of effective channels resulting from transmit analog beamforming, wherein the transmit analog beamforming is associated with the reference signals and analog beamformed physical channels.

8. The architecture of claim 1, wherein the control component is configured to measure a reference signal received power (RSRP) on the reference signals associated with each reference signal port of each cell, determine an aggregated RSRP and an aggregated reference signal received quality (RSRQ), wherein the aggregated RSRP and/or the RSRQ are used to determine a serving cell or an anchor cell.

9. The architecture of claim 1, wherein the control component is configured to determine communication metrics including channel state information measurement and radio resource management measurement.

10. The architecture of claim 1, wherein a network entity provides the reference signals in every subframe.

11. The architecture of claim 1, wherein the reference signals are received in pre-determined subframes.

12. An architecture configured to be employed within an eNodeB, the architecture comprising:
- a communications array configured to generate a transmission signal including a plurality of beam patterns according to a plurality of transmit signals; and
- a control component configured to generate the plurality of transmit signals that include reference signals multiplexed on one or more symbols of a subframe, wherein the reference signals are analog beamformed cell-specific reference signals (AB-CRS) associated with one or more cells, wherein the plurality of transmit signals include a block that indicates a number of symbols to carry the AB-CRS.

13. The architecture of claim 12, wherein the beam patterns are associated with analog beamformed cell-specific reference signal ports.

14. The architecture of claim 12, wherein the transmission signal includes a frame having a master information block.

15. The architecture of claim 12, wherein the control component is configured to provide reference signals in pre-determined subframes.

16. One or more non-transitory computer-readable storage media having instructions that, when executed, cause a user equipment (UE) to:
- receive an indication of a number of symbols to carry analog beamformed cell-specific reference signals (AB-CRS);
- receive a transmitted signal;
- decode a plurality of AB-CRS from the transmitted signal;
- perform analog beam tracking of the transmitted signal using the decoded AB-CRS; and
- demodulate the transmitted signal using the decoded AB-CRS.

17. The computer-readable media of claim 16, comprising one or more computer-readable media having instructions that, when executed, further cause the one or more user equipments (UEs) to:
- determine the number of symbols to carry reference signals within a subframe based on a master information block (MIB).

18. The computer-readable media of claim 16, wherein the reference signals are separated from a PDSCH region of a subframe.

19. The computer-readable media of claim 16, wherein a master information block is determined using the decoded plurality of AB-CRS.

20. The computer-readable media of claim 16, comprising one or more computer-readable media having instructions that, when executed, further cause the one or more user equipments (UEs) to:
- determine communication metrics, including channel state information (CSI) measurement and radio resource management measurement from the decoded reference signals, wherein the communication metrics further include an aggregated reference signal received power (RSRP).

* * * * *